(12) United States Patent
Oosaki et al.

(10) Patent No.: US 8,643,889 B2
(45) Date of Patent: Feb. 4, 2014

(54) IMAGE READER

(75) Inventors: Masayoshi Oosaki, Aichi (JP); Hiroshi Morisaki, Aichi (JP); Hiroko Ishikawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 560 days.

(21) Appl. No.: 13/016,176

(22) Filed: Jan. 28, 2011

(65) Prior Publication Data

US 2011/0188085 A1  Aug. 4, 2011

(30) Foreign Application Priority Data

Jan. 29, 2010  (JP) ................. 2010-018100
Jan. 24, 2011  (JP) ................. 2011-011701

(51) Int. Cl.
*G06K 15/00* (2006.01)
*G06F 3/12* (2006.01)
*H04N 1/00* (2006.01)
*H04N 1/04* (2006.01)

(52) U.S. Cl.
USPC ........ 358/1.17; 358/1.13; 358/1.16; 358/408; 358/474; 358/488; 358/494; 358/496

(58) Field of Classification Search
None
See application file for complete search history.

(56) References Cited

U.S. PATENT DOCUMENTS

| | | | | |
|---|---|---|---|---|
| 4,908,719 A | * | 3/1990 | Nonoyama | 358/494 |
| 5,136,665 A | * | 8/1992 | Inoue | 382/284 |
| 5,444,554 A | * | 8/1995 | Muramatsu et al. | 358/494 |
| 5,751,438 A | * | 5/1998 | Murai et al. | 358/403 |
| 5,808,752 A | * | 9/1998 | Naba | 382/234 |
| 8,130,424 B2 | * | 3/2012 | Ishido | 358/474 |
| 2006/0103895 A1 | * | 5/2006 | Kohara | 358/474 |
| 2008/0037078 A1 | * | 2/2008 | Chen | 358/498 |
| 2008/0080024 A1 | * | 4/2008 | Ishido | 358/498 |
| 2008/0100881 A1 | * | 5/2008 | Yamada | 358/472 |
| 2008/0273229 A1 | * | 11/2008 | Morisawa | 358/498 |
| 2009/0116079 A1 | * | 5/2009 | Baba | 358/474 |
| 2009/0122365 A1 | | 5/2009 | Noda et al. | |
| 2009/0231638 A1 | * | 9/2009 | Umezawa | 358/474 |
| 2013/0120782 A1 | * | 5/2013 | Baba | 358/1.13 |

FOREIGN PATENT DOCUMENTS

| | | |
|---|---|---|
| JP | 2002-232646 A | 8/2002 |
| JP | 2006-86734 A | 3/2006 |
| JP | 2006-333003 A | 12/2006 |
| JP | 2008-153890 A | 7/2008 |
| JP | 2009-10690 A | 1/2009 |
| JP | 2009-124327 A | 6/2009 |

* cited by examiner

*Primary Examiner* — King Poon
*Assistant Examiner* — Vincent Peren
(74) *Attorney, Agent, or Firm* — Scully, Scott, Murphy & Presser

(57) ABSTRACT

An image reader is provided, which includes a controller that when a PC-scan mode is set as an output mode, the controller controls an image output unit to output second read data of a second side of a document sheet at each time when a storage unit stores the second read data output from a second image reading unit on a line-by-line basis, controls the storage device to store first read data of a first side of the document sheet during a time period from a time when a leading end of the document sheet reaches a reading position of a first image reading unit to a time when a trailing end of the document sheet passes through a reading position of the second image reading unit, and controls the image output unit to sequentially output the first read data stored on the storage unit, after completely outputting the second read data.

9 Claims, 8 Drawing Sheets

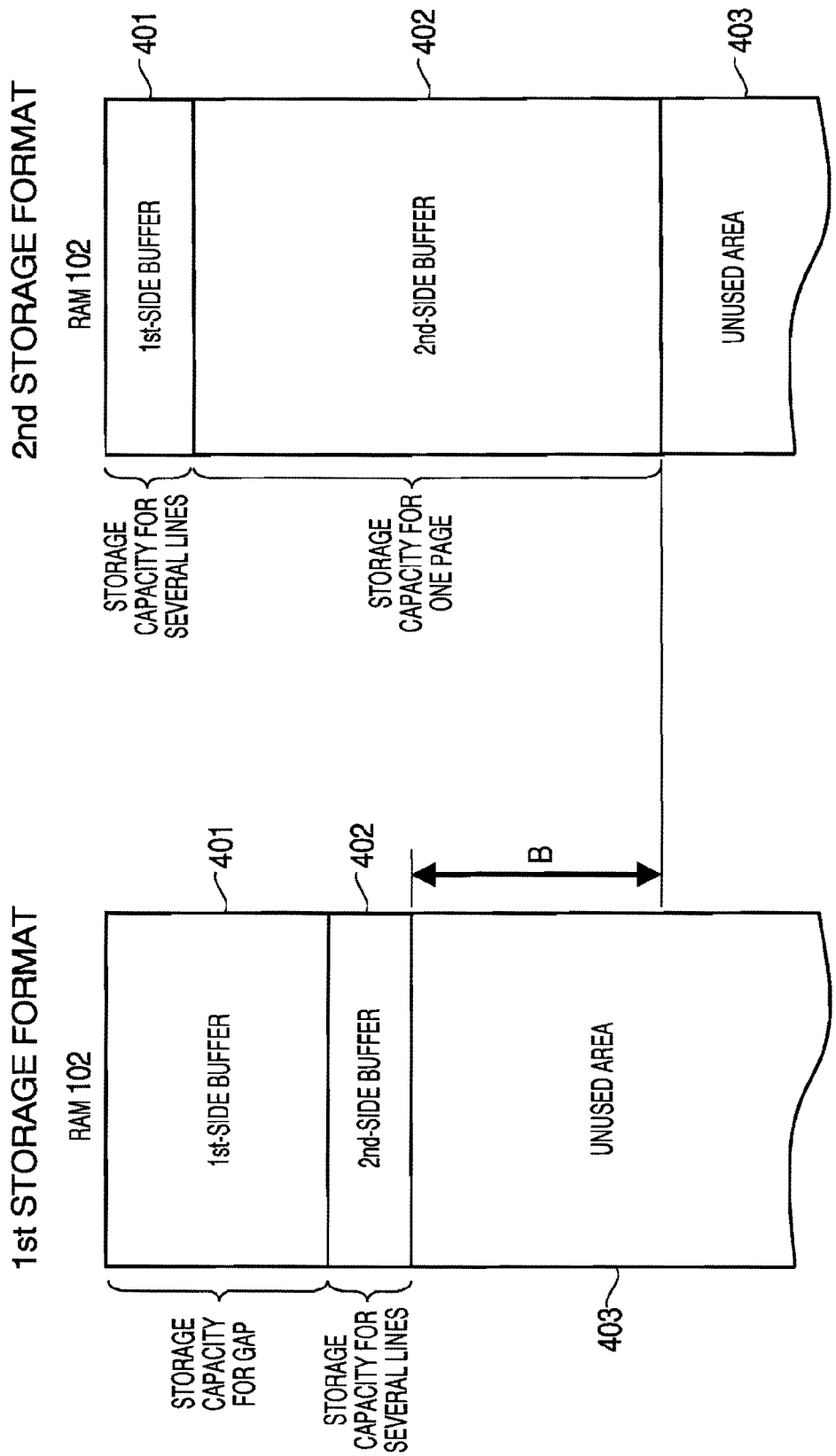

IMAGE READER

CROSS-REFERENCE TO RELATED APPLICATION

This application claims priority under 35 U.S.C. §119 from Japanese Patent Applications No. 2010-018100 filed on Jan. 29, 2010 and No. 2011-11701 filed on Jan. 24, 2011. The entire subject matters of the applications are incorporated herein by reference.

BACKGROUND

1. Technical Field

The following description relates to one or more image readers configured to read images on both sides of a document sheet.

2. Related Art

So far, an image reader (such as a copy machine and a facsimile machine) that includes an automatic document feeder (ADF) has been known, which image reader is provided with a feed tray configured such that document sheets to be read are placed thereon, a catch tray configured such that read document sheets are placed thereon, and first and second reading devices that are disposed in different positions on a feeding path and configured to read a first side and a second side of a document sheet, respectively. In an example of the known image reader, the second reading device configured to read the second side of the document sheet is disposed downstream on the feeding path relative to the first reading device configured to read the first side of the document sheet. Thereby, it is possible to read both the first and second sides of the document sheet in a single operation of feeding the document sheet.

SUMMARY

Unlike the aforementioned example, in the case of an image reader that includes two reading devices disposed to earlier read a second side of a document sheet and later read a first side of the document sheet, a page of read data of the earlier-read second side is stored on a memory. Then, the image reader outputs read data of the first side of the document sheet. The image reader is user-friendly since an image forming device such as a printer that employs the image reader prints the read data of the second side of the document sheet after printing the read data of the first side.

However, the aforementioned technique is required to store one page of the read data of the earlier-read second side of the document sheet, irrespective of differences in a reading condition in document reading and/or an output format such as "copy," "facsimile," and "PC-scan." Therefore, it is necessary for double-side reading to secure a large storage area on a memory of the image reader. It might result in undesired problems such as a lowered processing speed and inevitable need for a large-capacity memory.

Aspects of the present invention are advantageous to provide one or more improved image readers that make it possible to hold down a required memory capacity by switching between outputting read data of a first side of a document sheet after outputting read data of a second side of the document sheet and outputting the read data of the second side after outputting the read data of the first side, depending on a reading condition in document reading and/or an output format such as "copy," "facsimile," and "PC-scan."

According to aspects of the present invention, an image reader is provided, which includes a first image reading unit configured to read an image on a first side of a document sheet being conveyed on a feeding path and output first read data corresponding to the read image of the first side, sequentially on a line-by-line basis, a second image reading unit disposed upstream relative to the first image reading unit on the feeding path, the second image reading unit being configured to read an image on a second side of the document sheet being conveyed on the feeding path and output second read data corresponding to the read image of the second side, sequentially on a line-by-line basis, a storage unit configured to store the first read data output from the first image reading unit and the second read data output from the second image reading unit, a connection unit configured to connect the image reader with an external device therethrough, an output mode setting unit configured to set one of a plurality of output modes that include a PC-scan mode to transmit the first read data and the second read data to the external device via the connection unit, an image output unit configured to output the first read data and the second read data stored on the storage unit, in the output mode set by the output mode setting unit, and a controller configured to implement one of a first control method and a second control method. In the first control method, when the output mode setting unit sets the PC-scan mode, the controller controls the image output unit to output the second read data sequentially at each time when the storage unit stores the second read data that is output from the second image reading unit on the line-by-line basis, controls the storage device to store the first read data during a time period from a time when a leading end of the document sheet reaches a reading position of the first image reading unit to a time when a trailing end of the document sheet passes through a reading position of the second image reading unit, and controls the image output unit to sequentially output the first read data stored on the storage unit, after completely outputting the second read data. In the second control method, when the output mode setting unit sets an output mode other than the PC-scan mode, the controller controls the image output unit to output the first read data sequentially at each time when the storage unit stores the first read data that is output from the first image reading unit on the line-by-line basis, controls the storage device to store one page of the second read data, and controls the image output unit to sequentially output the second read data stored on the storage unit, after completely outputting the first read data.

According to aspects of the present invention, further provided is an image reader that includes a first image reading unit configured to read an image on a first side of a document sheet being conveyed on a feeding path and output first read data corresponding to the read image of the first side, sequentially on a line-by-line basis, a second image reading unit disposed upstream relative to the first image reading unit on the feeding path, the second image reading unit being configured to read an image on a second side of the document sheet being conveyed on the feeding path and output second read data corresponding to the read image of the second side, sequentially on a line-by-line basis, a storage unit configured to store the first read data output from the first image reading unit and the second read data output from the second image reading unit, a reading condition setting unit configured to set a reading condition for document reading by the first image reading unit and the second image reading unit, an image output unit configured to output the first read data and the second read data stored on the storage unit, and a controller configured to implement one of a first control method and a second control method. In the first control method, when the reading condition setting unit sets as the reading condition a first condition that requires a larger storage capacity of the storage unit in the document reading, the controller controls the image output unit to output the second read data sequentially at each time when the storage unit stores the second read data that is output from the second image reading unit on the line-by-line basis, controls the storage device to store the first read data during a time period from a time when a leading end of the document sheet reaches a reading position of the first image reading unit to a time when a trailing end of the document sheet passes through a reading position of the second image reading unit, and controls the image output unit to sequentially output the first read data stored on the storage unit, after completely outputting the second read data. In the second control method, when the reading condition setting unit sets as the reading condition a second condition that requires a smaller storage capacity of the storage unit in the document reading, the controller controls the image output unit to output the first read data sequentially at each time when the storage unit stores the first read data that is output from the first image reading unit on the line-by-line basis, controls the storage device to store one page of the second read data, and controls the image output unit to sequentially output the second read data stored on the storage unit, after completely outputting the first read data.

BRIEF DESCRIPTION OF THE ACCOMPANYING DRAWINGS

FIG. 8A shows a first storage format for the RAM of the MFP that is applied in the first reading process under reading conditions with a document size of A3 and a resolution of 600 dpi in the embodiment according to one or more aspects of the present invention.

FIG. 8B shows a second storage format for the RAM of the MFP that is applied in the second reading process under the reading conditions with a document size of A3 and a resolution of 600 dpi in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings. In the following embodiment, aspects of the present invention are applied to a multi-function peripheral (MFP) configured to carry out multiple functions such as a document reading function, a copy function, a facsimile function, and a PC-scan function.

Figure 1:
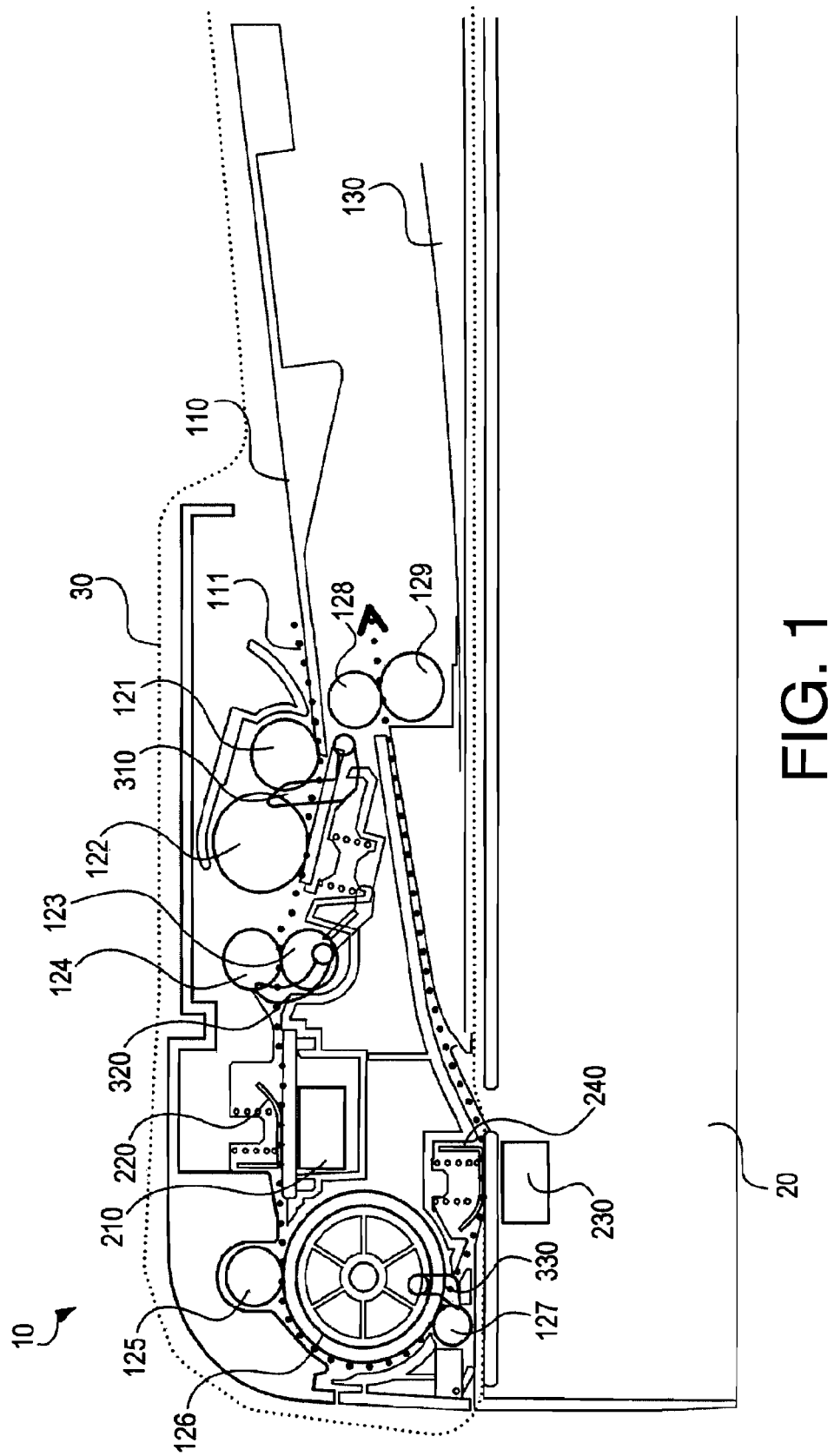
FIG. 1 is a cross-sectional view schematically showing a configuration of a multi-function peripheral (MFP) in an embodiment according to one or more aspects of the present invention.

As illustrated in FIG. 1, an MFP 10 includes a main body 20, and an automatic document feeder (ADF) 30 disposed above the main body 20. The ADF 30 is provided rotatably relative to the main body 20. As shown in FIG. 1, an upper surface of the main body 20 is covered with the ADF 30. Further, the main body 20 includes therein an image forming unit 104 (see FIG. 2) configured to print an image of a document sheet that is read by the MFP 10.

The ADF 30 includes a feed tray 110 configured such that document sheets to be read are placed thereon, a catch tray 130 configured such that read document sheets are ejected thereon, and feed rollers 121 to 127 configured to convey the document sheets placed on the feed tray 110 along a feeding path 111. Further, the ADF 30 includes eject rollers 128 and 129 configured to feed, onto the catch tray 130, the document sheets conveyed by the feed rollers 121 to 127.

It is noted that in the following description, an up-facing side of a document sheet in the state placed on the feed tray 110 in FIG. 1 will be defined as a first side of the document sheet. Meanwhile, a down-facing side of the document sheet in the state placed on the feed tray 110 in FIG. 1 will be defined as a second side of the document sheet.

In addition, on the feeding path 111, an F sensor 310, an RB sensor 320, an R sensor 330 are provided as sensors for detecting positions of a document sheet being conveyed along the feeding path 111.

A reading device 210 for reading the second side of the document sheet is disposed in a position facing a document pressing member 220 on the feeding path 111. The document pressing member 220 is configured to press a passing document sheet against a reading surface of the reading device 210. It is noted that a contact image sensor (CIS) or a charge couple device (CCD) is typically employed for the reading device 210.

Further, a reading device 230, which is provided to the main body 20 and configured to read the first side of the document sheet, is disposed in a position facing a document pressing member 240 on the feeding path 111. The document pressing member 240 is configured to press a document sheet, which is passing through a position corresponding to the document pressing member 240 on the feeding path 111, against a reading surface of the reading device 230. It is noted that a CIS or a CCD is typically employed for the reading device 230 as well.

As described above, the reading device 210 reads the second side of the document sheet from one of two sides that face each other across the feeding path 111. Meanwhile, the reading device 230 reads the first side of the document sheet from the other of the two sides that face each other across the feeding path 111. It is noted that each of the document pressing members 220 and 240 is formed from a white plate having a predetermined reflectivity.

The MFP 10 may be configured in any other fashion as far as the ADF 30 is applicable thereto. In the embodiment, aspects of the present invention are applied to the MFP 10 having the main body 20 and the ADF 30. Nevertheless, aspects of the present invention may be applied to an image recording device configured to record an image by making image recording agent such as toner and ink adhere onto a recording sheet, or to a sheet feeding device configured to feed a recording sheet to an image recording position in the image recording device.

Figure 2:
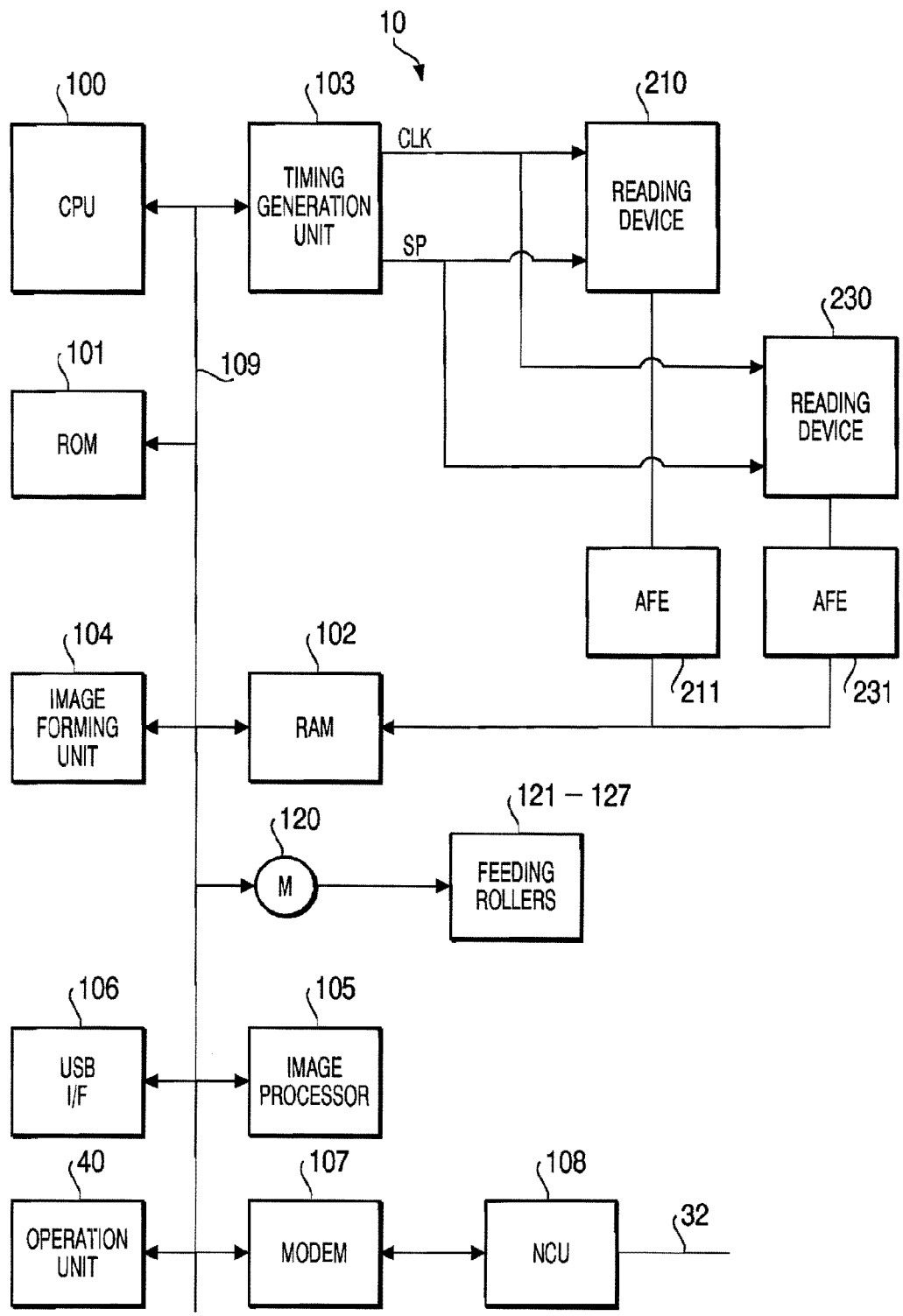
FIG. 2 is a block diagram showing an electrical configuration of the MFP in the embodiment according to one or more aspects of the present invention.

As depicted in FIG. 2, the MFP 10 includes a CPU 100, a ROM 101, a RAM 102, a timing generation unit 103, an image forming unit 104, an image processor 105, a USB interface 106, a modem 107, a motor 120, an operation unit 40 configured to input various settings for the MFP 10 therethrough, and a bus 109 interconnecting the above elements.

Further, as elements concerning image reading, the MFP 10 includes the reading device 210, the reading device 230, and AFE circuits 211 and 231.

The ROM 100 stores various control programs, settings, and initial values for controlling the MFP 10. The RAM 102 is utilized as a work area into which the various control programs are loaded or a storage area to temporarily store read data of document images read by the reading devices 210 and 230.

The CPU 100 is configured to take control of each element interconnected via the bus 109 while storing results of the control onto the RAM 102, in accordance with a control program read out of the ROM 101.

Further, the operation unit 40 is configured with one or more input devices such as a keyboard. Through the operation unit 40, a user can set a function to be executed among the multiple functions of the MFP 10 such as the copy function, the facsimile function, and the PC-scan function, and also set a reading condition such as a resolution for document reading.

The timing generation unit 103 provides each of the reading devices 210 and 230 with a reference clock (CLK) for activating the reading devices 210 and 230 and a pulse signal (SP) issued based on the reference clock with a period corresponding to one-line reading.

Further, the timing generation unit 103 transmits the reference clock (CLK) and the pulse signal (SP) with the period of one-line reading to the motor 120 as well as the reading devices 210 and 230, via the bus 109. The motor 120 is a stepping motor, which is driven by a pulse of driving signal to rotate by a predetermined rotational angle of one step. When the motor 120 is driven to rotate by the predetermined rotational angle of one step, the feed rollers 121 to 127 are driven such that the document sheet is conveyed on the feeding path 111 by a predetermined distance.

Each of the reading devices 210 and 230 is configured in a known fashion and provided with a light source (not shown) and a plurality of photo sensors (not shown) arranged linearly. The light source emits light onto the document sheet, and the linearly arranged photo sensors detect light intensity of the light reflected by the document sheet.

Then, each of the reading devices 210 and 230 outputs an analog signal corresponding to read data of the read document sheet. The analog signal corresponding to the read data, which is output from each of the reading devices 210 and 230, is converted into a digital signal corresponding to the read data through an A/D converting circuit of a corresponding analog front end circuit (AFE) 211 or 231. Each of the AFE 211 and 231 performs a known correction process concerning document reading such as shading correction for the read data of the analog signal, and converts the corrected read data of the analog signal into the read data of the digital signal.

Then, the read data of the digital signal is stored onto the RAM 102. The image processor 105 performs image processing for the read data stored on the RAM 102. The image processor 105 is configured to carry out image processing (e.g., a color conversion process and a process of enlarging/reducing the read image) for the read data stored on the RAM 102.

The MFP 10 is configured to perform each function of the copy function, the facsimile function, and the PC-scan function. When the MFP 10 performs the copy function, the image processor 105 transmits the image-processed read data to the image forming unit 104. The image forming unit 104 provided to the main body 20 prints the read data on a sheet. It is noted that the image forming unit 104 may be configured to form an image in a known method such as an electrophotographic method and an inkjet method.

The read data stored on the RAM 102 is RGB read data that is read by illuminating the document sheet with light of each of the three colors, i.e., red (R), green (G), blue (B) that is emitted by the light source (not shown) of each of the reading devices 210 and 230. In the case where an electrophotographic method is employed as an image forming method of the image forming unit 104, for instance, a printing technique using four colors, i.e., cyan (C), yellow (Y), magenta (M), and black (K) has been known. In this case, the image processor 105 performs a color conversion process to convert the RGB read data into CYMK read data. Then, the image forming unit 104 actually prints the CYMK read data after the color conversion process on the sheet.

The modem 107 is configured to send and receive image information and a procedure signal for sending/receiving the image information. Further, the modem 107 is configured to demodulate modulated image information that is received from a communication terminal device connected with a telephone line 32 and modulate image information to be sent.

When the MFP 10 implements the facsimile function, the image processor 105 outputs the image-processed read data to the modem 107. The modem 107 modulates the read data into image information to be sent, and transmits the image information (i.e., the modulated read data) to a communication terminal device as a destination device via a network control unit (NCU) 108. The NCU 108 is connected with the telephone line 32 and configured to control the telephone line 32 in a predetermined manner required when detecting a call signal or sending/receiving a call.

When the MFP 10 implements the PC-scan function, the image processor 105 transmits the image-processed read data to the USB interface 106. Then, the read data is transmitted to an external information terminal device (not shown) such as a personal computer via the USB interface 106, and thus the PC-scan function is achieved.

Figure 3:
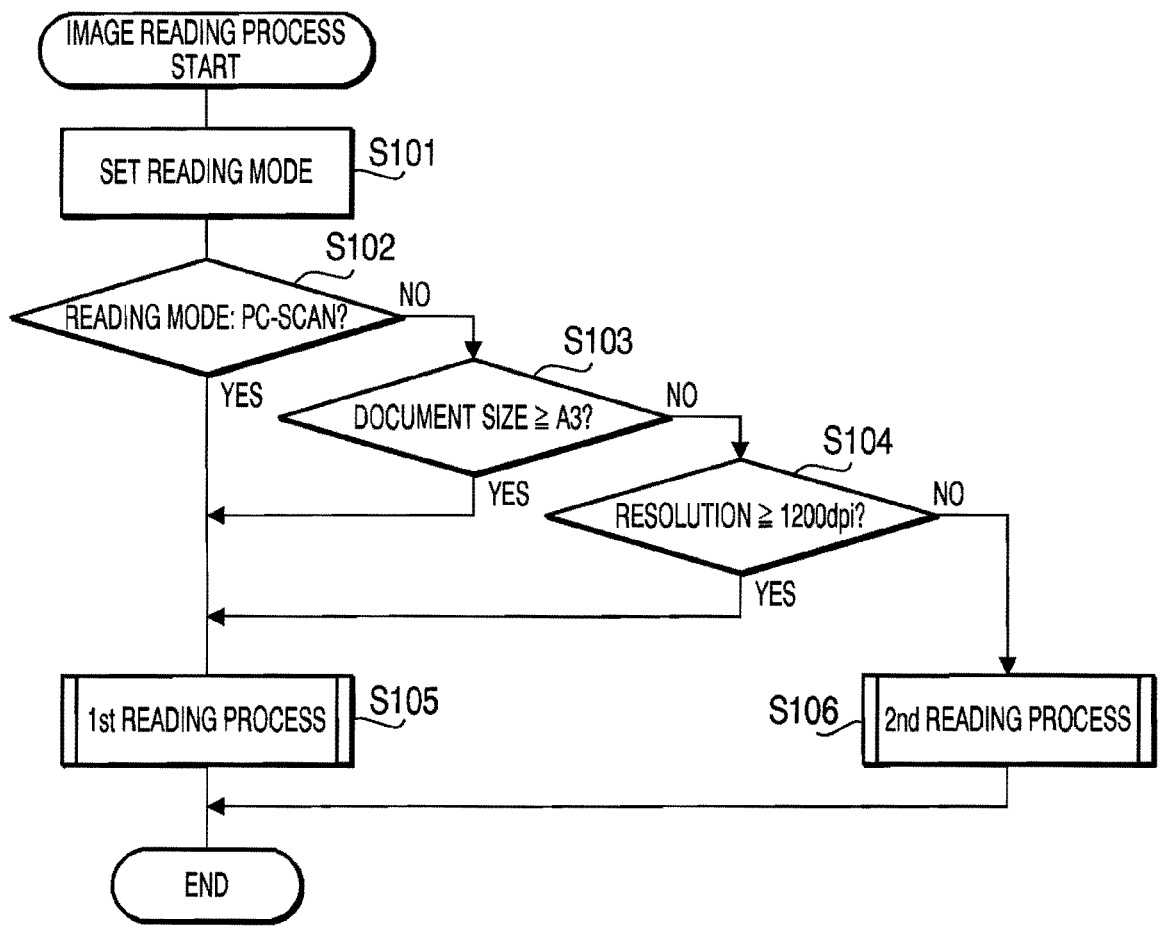
FIG. 3 is a flowchart showing a procedure of an image reading process by the MFP in the embodiment according to one or more aspects of the present invention.

Subsequently, an explanation will be provided about an image reading process in which the MFP 10 reads images of a document sheet, with reference to FIG. 3. Initially, in S101, the CPU 100 accepts user settings that are input by a user through the operation unit 40 and contain an output mode of the MFP 10 (e.g., "copy," "facsimile," "PC-scan," etc.), and reading conditions such as a document size (e.g., A3, A4, etc.)

and a resolution (e.g., 600 dpi, 1200 dpi, etc.) applied when the reading devices 210 and 230 read images of the document sheet. Then, the CPU 100 stores onto the RAM 102 the user settings such as the output mode and reading conditions.

Next, the CPU 100 determines whether the output mode stored on the RAM 102 is "PC-scan" (S102). When determining that the output mode stored on the RAM 102 is "PC-scan" (S102: Yes), the CPU 100 performs a first reading process in accordance with a control program stored on the ROM 101 (S105).

When determining that the output mode stored on the RAM 102 is not "PC-scan" (S102: No), the CPU 100 determines whether the document size is equal to or more than A3, based on the reading conditions stored on the RAM 102 (S103). When determining that the document size is equal to or more than A3 (S103: Yes), the CPU 100 performs the first reading process (S105).

When determining that the document size is less than A3 (S103: No), the CPU 100 determines whether the resolution is equal to or more than 1200 dpi, based on the reading conditions stored on the RAM 102 (S104). When determining that the resolution is equal to or more than 1200 dpi (S104: Yes), the CPU 100 performs the first reading process (S105).

When determining that the resolution is less than 1200 dpi (S104: No), the CPU 100 performs a second reading process (S106).

Namely, in the embodiment, the CPU 100 performs the first reading process (S105) when at least one of the above requirements is satisfied, i.e., the output mode is "PC-scan," the document size is equal to or more than A3, or that the resolution is equal to or more than 1200 dpi. Meanwhile, the CPU 100 performs the second reading process (S106) when none of the above requirements is satisfied. When completing the first reading process (S105) or the second reading process (S106), the CPU 100 terminates the image reading process shown in FIG. 3.

1. First Reading Process

Figure 4:
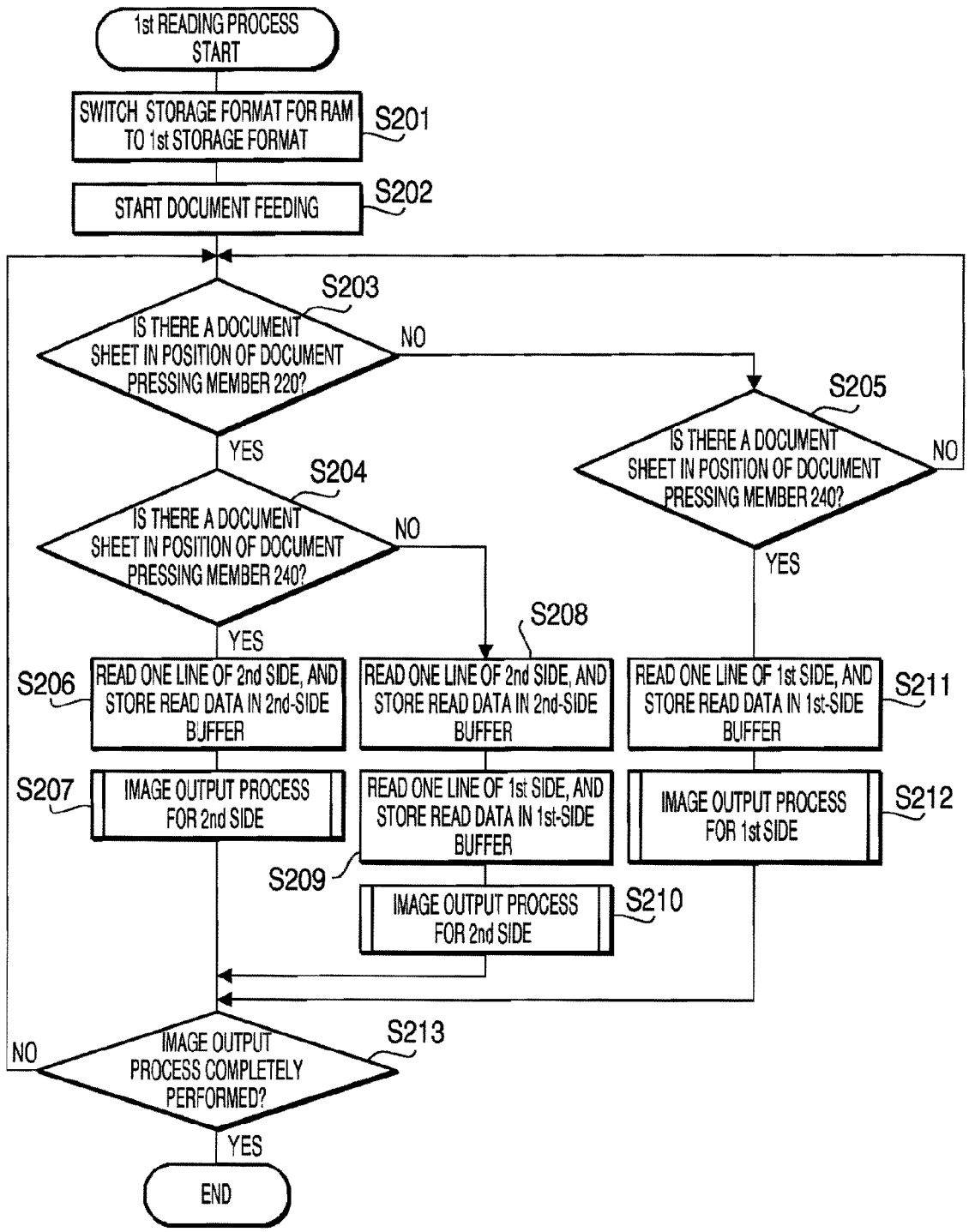
FIG. 4 is a flowchart showing a procedure of a first reading process to be executed in the image reading process in the embodiment according to one or more aspects of the present invention.

Subsequently, an explanation will be provided about the first reading process (S105), with reference to FIG. 4.

Figure 5:
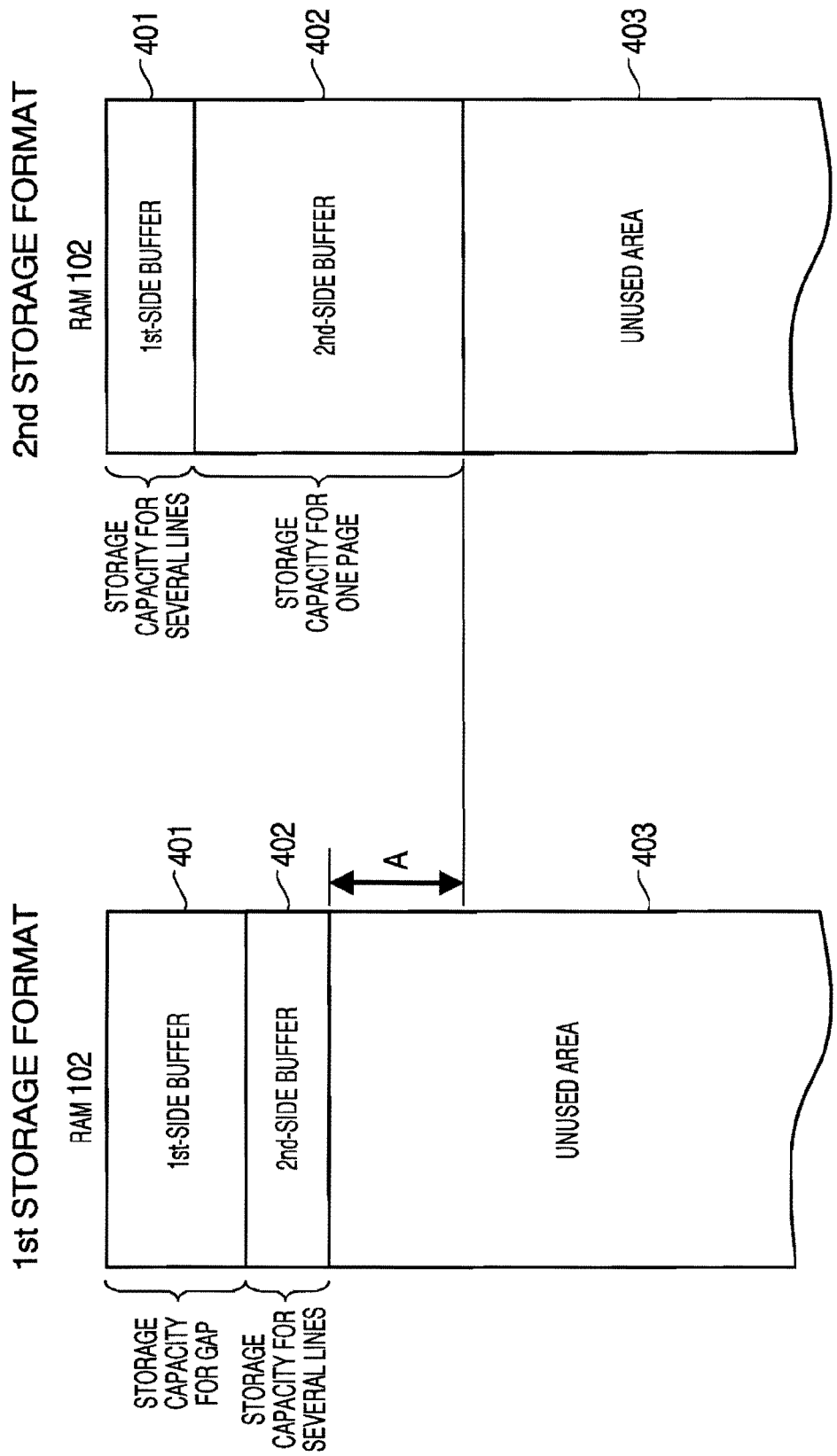
FIG. 5A shows a first storage format for a RAM of the MFP that is applied in the first reading process under reading conditions with a document size of A4 and a resolution of 600 dpi in the embodiment according to one or more aspects of the present invention.
FIG. 5B shows a second storage format for the RAM of the MFP that is applied in a second reading process under the reading conditions with a document size of A4 and a resolution of 600 dpi in the embodiment according to one or more aspects of the present invention.

In the first reading process, initially, the CPU 100 switches the storage format for the RAM 102 to a first storage format (S201). FIGS. 5A, 5B, 8A, and 8B illustrate storage formats for the RAM 102 each of which includes a first-side buffer 401 to store the read data created when the reading device 210 reads the image on the first side of the document sheet and a second-side buffer 402 to store the read data created when the reading device 230 reads the image on the second side of the document sheet. FIGS. 5A and 5B exemplify storage formats under reading conditions with a document size of A4 and a resolution of 600 dpi. FIGS. 8A and 8B exemplify storage formats under reading conditions with a document size of A3 and a resolution of 600 dpi. The first storage format is a storage format of the RAM 102 as shown in FIGS. 5A and 8A.

For the first-side buffer 401, a storage capacity (hereinafter referred to as a storage capacity for gap) is secured that is required to store data read during a time period from a time when a leading end of the document sheet reaches the reading position of the reading device 230 to a time when a trailing end of the document sheet passes through the reading position of the reading device 210. It is noted that the CPU 100 determines the storage capacity for gap based on the reading conditions such as the document size and the resolution set in S101 and a distance on the feeding path 111 between the reading position of the reading device 230 and the reading position of the reading device 210. Then, the CPU 100 secures, on the RAM 102, the storage capacity for gap as a storage capacity for the first-side buffer 401.

For the second-side buffer 402, a storage capacity for several lines is secured that is required for processing by the image processor 105. A remaining storage capacity on the RAM 102 is defined as an unused area 403.

A second storage format used in the second reading process (S106) is a storage format of the RAM 102 as shown in FIGS. 5B and 8B. As illustrated in FIGS. 5B and 8B, in the second storage format, a storage capacity for several lines, which is required for processing by the image processor 105, is secured as the first-side buffer 401. Additionally, as illustrated in FIGS. 5B and 8B, in the second storage format, a storage capacity for one page of the document sheet is secured as the second-side buffer 402.

Here, comparison will be made between the storage formats shown in FIGS. 5A and 5B under the reading conditions (1) that the document size and the resolution are A4 and 600 dpi, respectively and the storage formats shown in FIGS. 8A and 8B under the reading conditions (2) that the document size and the resolution are A3 and 600 dpi, respectively. It is noted that the storage capacities for a single document sheet under the reading conditions (1) and the reading conditions (2) are 102 Mbytes (see FIGS. 5A and 5B) and 201 Mbytes (see FIGS. 8A and 8B), respectively. When the distance on the feeding path 111 between the reading positions of the reading device 230 and the reading device 210 is 110 mm, the storage capacities for gap under the reading conditions (1) and the reading conditions (2) are 66 Mbytes (see FIGS. 5A and 5B) and 150 Mbytes (see FIGS. 8A and 8B), respectively. Further, the same storage capacities are secured for the second-side buffer shown in FIG. 5A and the first-side buffer shown in FIG. 5B.

A reduced amount A shown in FIGS. 5A and 5B represents an amount obtained by subtracting a summed storage capacity of the first-side buffer 401 and the second-side buffer 402 in the first storage format shown in FIG. 5A from a summed storage capacity of the first-side buffer 401 and the second-side buffer 402 in the second storage format shown in FIG. 5B. Namely, the reduced amount A is a reduced storage capacity determined when the first storage format is compared with the second storage format under the reading conditions (1) that the document size and the resolution are A4 and 600 dpi, respectively. Under the reading conditions (1) that the document size and the resolution are A4 and 600 dpi, respectively, the reduced amount A is 36 Mbytes that is obtained by subtracting 66 Mbytes from 102 Mbytes.

In the same manner, a reduced amount B shown in FIGS. 8A and 8B represents an amount obtained by subtracting a summed storage capacity of the first-side buffer 401 and the second-side buffer 402 in the first storage format shown in FIG. 8A from a summed storage capacity of the first-side buffer 401 and the second-side buffer 402 in the second storage format shown in FIG. 8B. Namely, the reduced amount B is a reduced storage capacity determined when the first storage format is compared with the second storage format under the reading conditions (2) that the document size and the resolution are A3 and 600 dpi, respectively. Under the reading conditions (2) that the document size and the resolution are A3 and 600 dpi, respectively, the reduced amount B is 51 Mbytes that is obtained by subtracting 150 Mbytes from 201 Mbytes.

Namely, when the first storage format is employed, the reduced amount, which is determined as a reduced storage capacity in comparison with the second storage format under the reading conditions (2) with a document size of A3 and a resolution of 600 dpi is larger than that under the reading conditions (1) with a document size of A4 and a resolution of 600 dpi.

Further, it is assumed that the document size and the resolution are A4 and 300 dpi, respectively (reading conditions (3)), and that the document size and the resolution are A4 and 1200 dpi, respectively (reading conditions (4)). It is noted that the storage capacities for a single document sheet under the reading conditions (3) and the reading conditions (4) are 27 Mbytes and 399 Mbytes, respectively. When the distance on the feeding path 111 between the reading positions of the reading device 230 and the reading device 210 is 110 mm, the storage capacities for gap under the reading conditions (3) and the reading conditions (4) are 18 Mbytes and 258 Mbytes, respectively. Namely, the reduced amount is 9 Mbytes under the reading conditions (3) with a document size of A4 and a resolution of 300 dpi. Further, the reduced amount is 141 Mbytes under the reading conditions (4) with a document size of A4 and a resolution of 1200 dpi.

When there is a vacant storage capacity of about 50 Mbytes on the RAM 102, it means that the MFP 10 secures the lowest limit storage capacity required for using functions such as an image forming function and the facsimile function other than the image reading function. For instance, when the reduced amount is equal to or more than 50 Mbytes, the first storage format is more efficient for the MFP 10 than the second storage format.

In the case of document reading under the reading conditions (4) that the document size and the resolution are A4 and 1200 dpi, respectively, the reduced amount is 141 Mbytes which is a large amount of storage capacity. The MFP 10 is more desired to employ the first storage format for the RAM 102 than the second storage format. Meanwhile, when document reading is performed with a resolution of 300 dpi, even though the MFP 10 employs the first storage format for the RAM 102, the reduced amount is 9 Mbytes which is less than 50 Mbytes. In this case, since the MFP 10 has few advantages when employing the first storage format for the RAM 102, the second reading process using the second storage format is more desired.

For the aforementioned reasons, in the embodiment, when document reading is performed under reading conditions with a document size equal to or more than A3 and a resolution equal to or more than 1200 dpi, the CPU 100 takes control to perform the first reading process (S105). It is noted that under reading conditions with a document size equal to or more than A3 and a resolution equal to or more than 1200 dpi, the CPU 100 may take control to perform the first reading process (S105) based on a determination that the reduced amount is equal to or more than an enough storage capacity (50 Mbytes) to implement functions other than the image reading function.

Next, the CPU 100 issues an instruction to drive the feed rollers 121 to 127 such that the document sheet is conveyed along the feeding path 111 (S202).

Subsequently, the CPU 100 determines whether there is a document sheet in a position of the document pressing member 220 on the feeding path 111, based on whether the RB sensor 320 detects the document sheet (S203).

When determining that there is a document sheet in the position of the document pressing member 220 on the feeding path 111 (S203: Yes), the CPU 100 determines whether there is a document sheet in a position of the document pressing member 240 on the feeding path 111, based on whether the R sensor 330 detects the document sheet (S204).

When determining that there is not a document sheet in the position of the document pressing member 220 on the feeding path 111 (S203: No), the CPU 100 determines whether there is a document sheet in the position of the document pressing member 240 on the feeding path 111, based on whether the R sensor 330 detects the document sheet (S205), in the same manner as described above.

Specifically, when the document sheet is conveyed by the feed rollers 121 to 127 to be in the position of the document pressing member 220 on the feeding path 111 but not in the position of the document pressing member 240 (S203: Yes and S204: No), the CPU 100 executes S206 and S207 in which the reading device 210 reads the image on the second side of the document sheet.

Further, when the document sheet is in both the position of the document pressing member 220 and the position of the document pressing member 240 on the feeding path 111 (S203: Yes and S204: Yes), the CPU 100 executes S208, S209, and S210 in which the reading devices 210 and 230 read the images on the first and second sides of the document sheet together.

Further, when the document sheet is not in the position of the document pressing member 220 but in the position of the document pressing member 240 on the feeding path 111 (S203: No and S205: Yes), the CPU 100 executes S211 in which the reading device 230 reads the image on the first side of the document sheet and S212.

[In the Case Where the Document Sheet is in Only the Position of the Document Pressing Member 220 on the Feeding Path 111]

When the document sheet is in the position of the document pressing member 220 on the feeding path 111 but not in the position of the document pressing member 240 (S203: Yes and S204: No), the CPU 100 controls the reading device 210 to read one line of the image on the second side of the document sheet, and stores the read data of the second side into the second-side buffer 402 in the first storage format (S206).

Next, the CPU 100 performs an image output process for the second side to output the read data stored in the second-side buffer 402 of the RAM 102 (S207).

Figure 6:
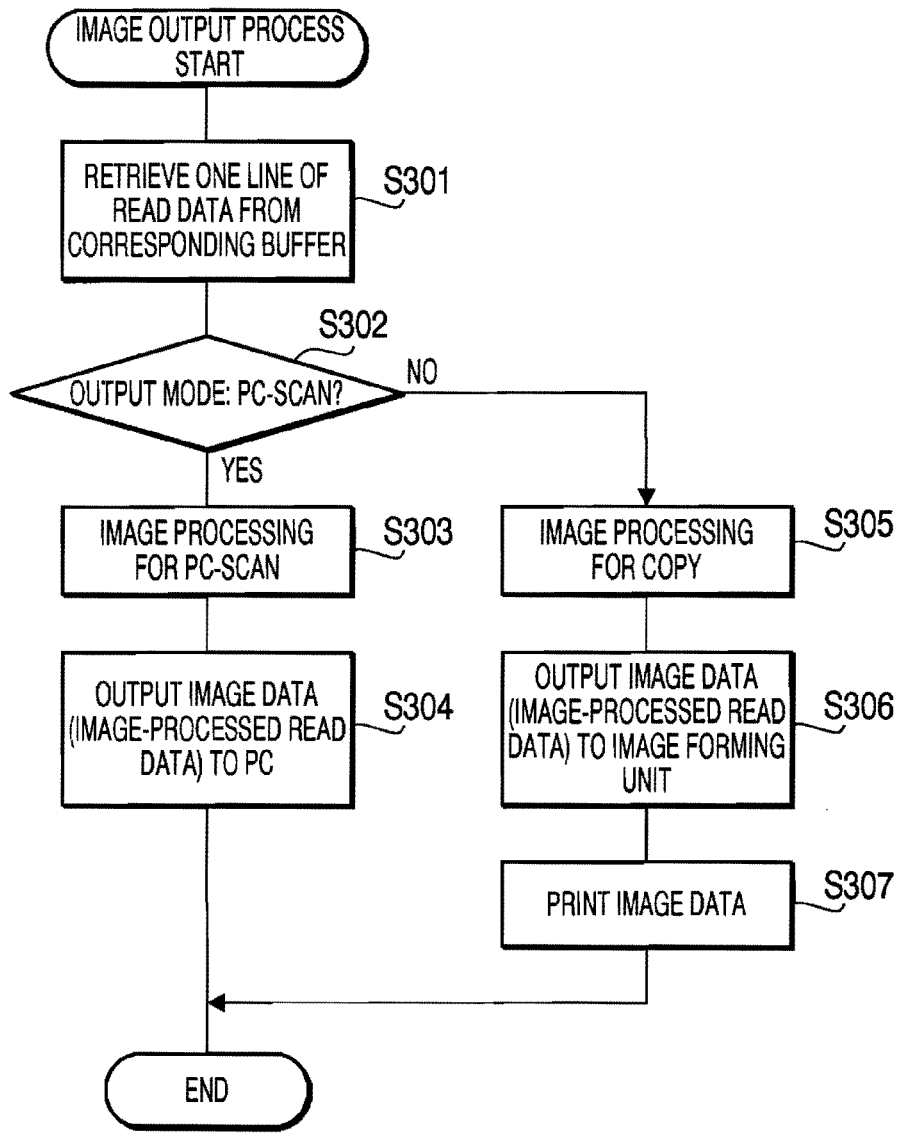
FIG. 6 is a flowchart showing a procedure of an image output process in the embodiment according to one or more aspects of the present invention.

The second-side image output process in S207 shown in FIG. 4 will be described with reference to FIG. 6. Initially, the CPU 100 transfers, to the image processor 105, one line of the read data of the second side that is stored in the second-side buffer 402 in the first storage format (S301). It is noted that read data of the second side stored in the second-side buffer 402 is deleted from the second-side buffer 402 at the time when transferred to the image processor 105.

Then, the CPU 100 determines whether the output mode set in S101 is "PC-scan" (S302). When determining that the output mode is "PC-scan" (S302: Yes), the CPU 100 controls the image processor 105 to perform image processing for PC-scan (S303). Thereafter, the CPU 100 controls the image processor 105 to output the read data image-processed by the image processor 105 to the USB interface 106 (S304).

Meanwhile, when determining that the output mode is not "PC-scan" but e.g., "copy" (S302: No), the CPU 100 controls the image processor 105 to perform image processing for copy (S305). Then, the CPU 100 controls the image processor 105 to transmit the read data image-processed by the image processor 105 to the image forming unit 104 (S306). Thereafter, the CPU 100 controls the image forming unit 104 to print the image-processed read data (S307).

When the image output process has not completely been performed for the whole first and second sides of the document sheet (S213: No), and the document sheet is in the position of the document pressing member 220 on the feeding path 111 but not in the position of the document pressing member 240 (S203: Yes and S204: No), the CPU 100 sequentially executes S206 and S207 each time the document sheet is conveyed by the aforementioned predetermined distance corresponding to one-step driving of the motor 120.

[In the Case Where the Document Sheet is in both the Position of the Document Pressing Member 220 and the Position of the Document Pressing Member 240 on the Feeding Path 111]

When the document sheet is further conveyed on the feeding path 111 by the feed rollers 121 to 127, the leading end of the document sheet reaches the reading position of the reading device 230. In this situation, the document sheet is in both the position of the document pressing member 220 and the position of the document pressing member 240 on the feeding path 111 (S203: Yes and S204: Yes).

In the same manner as executed in S206, the CPU 100 controls the reading device 210 to read one line of the image on the second side of the document sheet and stores the read data of the second side into the second-side buffer 402 in the first storage format (S208).

Then, the CPU 100 controls the reading device 230 to read one line of the image on the first side of the document sheet and stores the read data of the first side into the first-side buffer 401 in the first storage format (S209).

In the same manner as executed in S207, the CPU 100 performs the image output process for the second side to output the read data stored in the second-side buffer 402 of the RAM 102 (S210).

When the image output process has not completely been performed for the whole first and second sides of the document sheet (S213: No), and the document sheet is in both the position of the document pressing member 220 and the position of the document pressing member 240 on the feeding path 111 (S203: Yes and S204: Yes), the CPU 100 sequentially executes S208 and S209 each time the document sheet is conveyed by the predetermined distance corresponding one-step driving of the motor 120. The situation where the document sheet is in both the position of the document pressing member 220 and the position of the document pressing member 240 is realized during the time period from the time when the leading end of the document sheet reaches the reading position of the reading device 230 to the time when the trailing end of the document sheet passes through the reading position of the reading device 210. The read data of the first side is stored into the first-side buffer 401.

[In the Case Where the Document Sheet is in Only the Position of the Document Pressing Member 240 on the Feeding Path 111]

When the document sheet is further conveyed on the feeding path 111 by the feed rollers 121 to 127, the trailing end of the document sheet passes through the reading position of the reading device 210. In this situation, the document sheet is not in the position of the document pressing member 220 but in the position of the document pressing member 240 on the feeding path 111 (S203: No and S205: Yes).

At this time, the CPU 100 controls the reading device 230 to read one line of the image on the first side of the document sheet and stores the read data of the first side into the first-side buffer 401 in the first storage format (S211).

Then, the CPU 100 performs an image output process for the first side to output the read data stored in the first-side buffer 401 (S212). It is noted that the image output process for the first side is substantially the same as the image output process for the second side that is executed in S207 in accordance with the procedure as shown in FIG. 6. In this respect, however, there is a difference between the two kinds of image output processes in that in the image output process for the first side, the first-side buffer 401 is applied instead of the second-side buffer 402. Further, in S301 of the image output process for the first side that is executed in S212, the image processor 105 performs image processing sequentially from read data which has earlier been stored in the first-side buffer 401 in S209. Then, the CPU 100 controls the image processor 105 to output the image-processed read data to a corresponding element depending on the output mode (i.e., the USB interface 106 in the output mode "PC-scan," the image forming unit 104 in the output mode "copy," and the modem 107 in the output mode "facsimile").

When the image output process has completely been performed for the whole first and second sides of the document sheet (S213: Yes), the CPU 100 terminates the first reading process shown in FIG. 4.

In the image reading process of the embodiment, as described above, with respect to the reading conditions, when the document size is equal to or more than A3, or the resolution is equal to or more than 1200 dpi (i.e., when a large storage capacity is required for document reading), the CPU 100 performs the first reading process (S105). When the output mode is "copy," it is desired from the viewpoint of user-friendliness that the read data of the second side is output after the read data of the first side is output. Hence, the technique to output the read data of the first side after outputting the read data of the second side as carried out in the first reading process is inconvenient from the viewpoint of user-friendliness.

However, under the reading conditions for the first reading process, the unused area 403 is larger in comparison with the case where the second reading process is performed. Thus, a storage capacity actually used on the RAM 102 is smaller. Therefore, the first reading process applying the first storage format for the RAM 102 as shown in FIG. 5A is more efficient. Moreover, the MFP 10 can use the unused area 403 as a storage area for another function.

2. Second Reading Process

Figure 7:
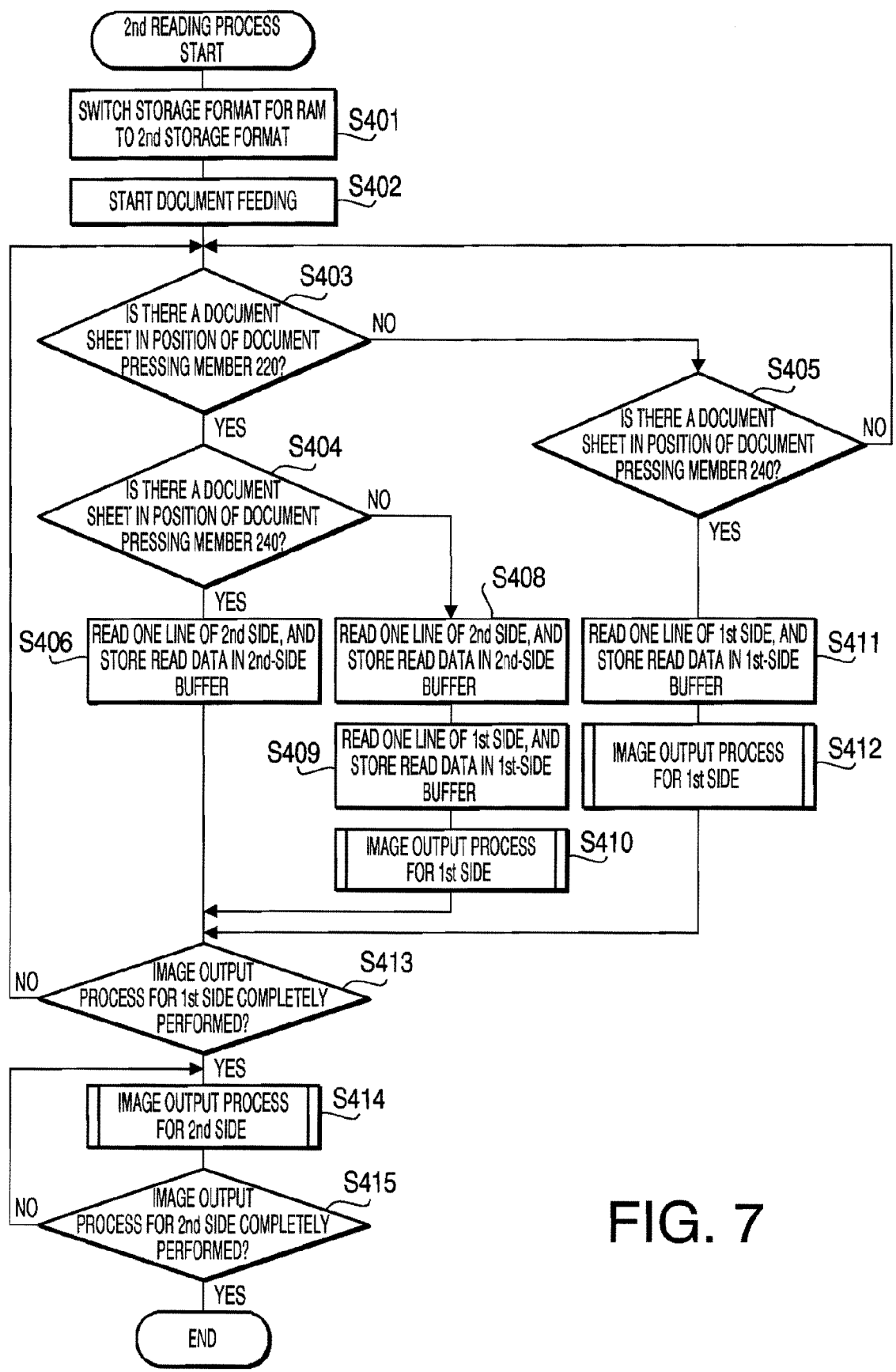
FIG. 7 is a flowchart showing a procedure of a second reading process to be executed in the image reading process in the embodiment according to one or more aspects of the present invention.

Subsequently, an explanation will be provided about the second reading process (S106) which is executed when the first reading process is not applied, with reference to FIG. 7.

In the second reading process, initially, the CPU 100 switches the storage format for the RAM 102 to the second storage format (S401). Next, the CPU 100 drives the feed rollers 121 to 127 to convey the document sheet along the feeding path 111 (S402).

Then, the CPU 100 determines whether there is a document sheet in the position of the document pressing member 220 on the feeding path 111 (S403), in the same manner as executed in S203.

When determining that there is a document sheet in the position of the document pressing member 220 on the feeding path 111 (S403: Yes), the CPU 100 determines whether there is a document sheet in the position of the document pressing member 240 on the feeding path 111 (S404), in the same manner as executed in S204.

When determining that there is not a document sheet in the position of the document pressing member 220 on the feeding path 111 (S403: No), the CPU 100 determines whether there is a document sheet in the position of the document pressing member 240 on the feeding path 111 (S405), in the same manner as executed in S205.

Namely, when the document sheet is in the position of the document pressing member 220 on the feeding path 111 but not in the position of the document pressing member 240 (S403: Yes and S404: No), the CPU 100 executes S406.

Further, when the document sheet is in both the position of the document pressing member 220 and the position of the document pressing member 240 on the feeding path 111 (S403: Yes and S404: Yes), the CPU 100 executes S408, S409, and S410 in which the reading devices 210 and 230 read the images on the first and second sides of the document sheet together.

Further, when the document sheet is not in the position of the document pressing member 220 but in the position of the document pressing member 240 on the feeding path 111 (S403: No and S405: Yes), the CPU 100 executes S411 and S412 in which the reading device 230 reads the image on the first side of the document sheet.

[In the Case Where the Document Sheet is in Only the Position of the Document Pressing Member 220 on the Feeding Path 111]

When the document sheet is in the position of the document pressing member 220 on the feeding path 111 but not in the position of the document pressing member 240 (S403: Yes and S404: No), the CPU 100 controls the reading device 210 to read one line of the image on the second side of the document sheet, and stores the read data of the second side into the second-side buffer 402 in the second storage format (S406).

When the image output process has not completely been performed for the whole first side of the document sheet (S413: No), and the document sheet is in the position of the document pressing member 220 on the feeding path 111 but not in the position of the document pressing member 240 (S403: Yes and S404: No), the CPU 100 repeatedly executes S406 each time the document sheet is conveyed by the predetermined distance corresponding to one-step driving of the motor 120.

In S406, the CPU 100 stores the read data of the second side sequentially on a line-by-line basis into the second-side buffer 402.

[In the Case Where the Document Sheet is in Both the Position of the Document Pressing Member 220 and the Position of the Document Pressing Member 240 on the Feeding Path 111]

When the document sheet is further conveyed such that the leading end of the document sheet reaches the reading position of the reading device 230, the document sheet is in both the position of the document pressing member 220 and the position of the document pressing member 240 on the feeding path 111 (S403: Yes and S404: Yes).

In the same manner as executed in S406, the CPU 100 controls the reading device 210 to read one line of the image on the second side of the document sheet and stores the read data of the second side into the second-side buffer 402 in the second storage format (S408).

Then, the CPU 100 controls the reading device 230 to read one line of the image on the first side of the document sheet and stores the read data of the first side into the first-side buffer 401 in the second storage format (S409).

Next, the CPU 100 performs the image output process for the first side to output the read data stored in the first-side buffer 402 of the RAM 102 (S410). It is noted that the image output for the first side in S410 is substantially the same as the aforementioned image output process for the first side. Namely, the read data stored in the first-side buffer 401 is sequentially image-processed by the image processor 105 and then output.

When the image output process has not completely been performed for the whole first side of the document sheet (S413: No), and the document sheet is in both the position of the document pressing member 220 and the position of the document pressing member 240 on the feeding path 111 (S403: Yes and S404: Yes), the CPU 100 sequentially executes S406, S407, and S408 each time the document sheet is conveyed by the predetermined distance corresponding to one-step driving of the motor 120. The situation where the document sheet is in both the position of the document pressing member 220 and the position of the document pressing member 240 is realized during the time period from the time when the leading end of the document sheet reaches the reading position of the reading device 230 to the time when the trailing end of the document sheet passes through the reading position of the reading device 210. In the second reading process, the read data of the first side is output from the image processor 105 in advance of the read data of the second side, while one page of the read data of the second side is stored into the second-side buffer 402 until the trailing end of the document sheet passes through the reading position of the reading device 210.

[In the Case Where the Document Sheet is in Only the Position of the Document Pressing Member 240 on the Feeding Path 111]

When the trailing end of the document sheet passes through the reading position of the reading device 210, the document sheet is not in the position of the document pressing member 220 but in the position of the document pressing member 240 on the feeding path 111 (S403: No and S404: Yes).

The CPU 100 controls the reading device 230 to read one line of the image on the first side of the document sheet, and stores the read data of the first side into the first-side buffer 401 in the second storage format (S411).

Then, the CPU 100 performs the image output process for the first side to output the read data stored in the first-side buffer 401 of the RAM 102 (S412).

When having completely performed the image output process for the whole first side of the document sheet (S413: Yes), the CPU 100 performs the image output process for the second side (S414). Prior to execution of S414, the second-side buffer 402 in the second storage format has one page of the read data of the second side stored therein in an order read on a line-by-line basis. Hence, in S414, the CPU 100 retrieves the read data of the second side from the second-side buffer 402 and performs image processing for the retrieved data, on a line-by-line basis. When the image output process has not completely been performed for the whole second side of the document sheet (S415: No), the CPU 100 goes back to S414 to continue the image output process for the second side.

When the image output process has completely been performed for the whole second side of the document sheet (S415: Yes), the CPU 100 terminates the second reading process.

In the second reading process of the embodiment, under reading conditions other than such reading conditions that the first reading process is performed thereunder, the CPU 100 performs the second reading process (S106). As described above, the second reading process (S106) is desired to be configured to output the read data of the second side after outputting the read data of the first side, with a higher priority placed on user-friendliness.

Additionally, even under any reading conditions, when the output mode is "PC-scan," the CPU 100 is desired to perform the first reading process (S105).

This is because when the read data of the first and second sides of the document sheet is transmitted to an external information terminal device (e.g., a personal computer) as performed in the output mode "PC-scan," whichever between the read data of the first side and the read data of the second side has been transmitted earlier, an order to output the read data can be changed at the side of the external information terminal device. Therefore, the transmission order between the read data of the first side and the read data of the second side does not have such a crucial influence on user-friendliness. Hence, the MFP 10 is desired to read the document sheet in the first reading process that uses a smaller storage capacity of the RAM 102.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

In the aforementioned embodiment, the determinations as to whether the document size is equal to or more than A3 and whether the resolution is equal to or more than 1200 dpi are made individually in the respective separate steps. However, based on a combination of the condition regarding the document size and the condition regarding the resolution, a storage capacity required for document reading may be determined from how large the reduced amount of the RAM 102 is. Then, the reading process to be applied may be switched between the first reading process and the second reading process, based on the storage capacity required for document reading.

What is claimed is:

1. An image reader comprising:
a first image reading unit configured to read an image on a first side of a document sheet being conveyed on a feeding path and output first read data corresponding to the read image of the first side, sequentially on a line-by-line basis;
a second image reading unit disposed upstream relative to the first image reading unit on the feeding path, the second image reading unit being configured to read an image on a second side of the document sheet being conveyed on the feeding path and output second read data corresponding to the read image of the second side, sequentially on a line-by-line basis;
a storage unit configured to store the first read data output from the first image reading unit and the second read data output from the second image reading unit;
a connection unit configured to connect the image reader with an external device therethrough;
an output mode setting unit configured to set one of a plurality of output modes that include a PC-scan mode to transmit the first read data and the second read data to the external device via the connection unit;
an image output unit configured to output the first read data and the second read data stored on the storage unit, in the output mode set by the output mode setting unit; and
a controller configured to implement one of a first control method and a second control method, wherein in the first control method, when the output mode setting unit sets the PC-scan mode, the controller controls:
the image output unit to output the second read data sequentially at each time when the storage unit stores the second read data that is output from the second image reading unit on the line-by-line basis;
the storage device to store the first read data during a time period from a time when a leading end of the document sheet reaches a reading position of the first image reading unit to a time when a trailing end of the document sheet passes through a reading position of the second image reading unit; and
the image output unit to sequentially output the first read data stored on the storage unit, after completely outputting the second read data, and wherein in the second control method, when the output mode setting unit sets an output mode other than the PC-scan mode, the controller controls:
the image output unit to output the first read data sequentially at each time when the storage unit stores the first read data that is output from the first image reading unit on the line-by-line basis;
the storage device to store one page of the second read data; and
the image output unit to sequentially output the second read data stored on the storage unit, after completely outputting the first read data.

2. The image reader according to claim 1, further comprising a reading condition setting unit configured to set a reading condition for document reading by the first image reading unit and the second image reading unit, wherein in the first control method, when the output mode setting unit sets an output mode other than the PC-scan mode and the reading condition setting unit sets as the reading condition a first condition that requires a larger storage capacity of the storage unit in the document reading, the controller controls:
the image output unit to output the second read data sequentially at each time when the storage unit stores the second read data that is output from the second image reading unit on the line-by-line basis;
the storage device to store the first read data during a time period from a time when a leading end of the document sheet reaches a reading position of the first image reading unit to a time when a trailing end of the document sheet passes through a reading position of the second image reading unit; and
the image output unit to sequentially output the first read data stored on the storage unit, after completely outputting the second read data, and wherein in the second control method, when the output mode setting unit sets an output mode other than the PC-scan mode and the reading condition setting unit sets as the reading condition a second condition that requires a smaller storage capacity of the storage unit in the document reading, the controller controls:
the image output unit to output the first read data sequentially at each time when the storage unit stores the first read data that is output from the first image reading unit on the line-by-line basis;
the storage device to store one page of the second read data; and
the image output unit to sequentially output the second read data stored on the storage unit, after completely outputting the first read data.

3. The image reader according to claim 2,
wherein the reading condition setting unit sets, as the reading condition, one of a plurality of document sizes, and
wherein when the document size set by the reading condition setting unit is equal to or more than a predetermined size, the controller applies one of the first control method and the second control method based on a determination that the reading condition is the first condition, and
wherein when the document size set by the reading condition setting unit is less than the predetermined size, the controller applies one of the first control method and the second control method based on a determination that the reading condition is the second condition.

4. The image reader according to claim 2,
wherein the reading condition setting unit sets, as the reading condition, a resolution for the document reading by the first image reading unit and the second image reading unit, and
wherein when the resolution set by the reading condition setting unit is equal to or more than a predetermined value, the controller applies one of the first control method and the second control method based on a determination that the reading condition is the first condition, and
wherein when the resolution set by the reading condition setting unit is less than the predetermined value, the controller applies one of the first control method and the second control method based on a determination that the reading condition is the second condition.

5. The image reader according to claim 2, configured to implement multiple functions that include functions other than an image reading function,
wherein the first condition that requires a larger storage capacity of the storage unit in the document reading is a reading condition where a difference is larger than an enough storage capacity to implement the functions other than the image reading function, which difference is a storage capacity difference between:
a storage capacity required to store one page of the second read data output from the second image reading unit; and
a storage capacity required to store the first read data during the time period from the time when the leading end of the document sheet reaches the reading position of the first image reading unit to the time when the trailing end of the document sheet passes through the reading position of the second image reading unit.

6. An image reader comprising:
a first image reading unit configured to read an image on a first side of a document sheet being conveyed on a feeding path and output first read data corresponding to the read image of the first side, sequentially on a line-by-line basis;
a second image reading unit disposed upstream relative to the first image reading unit on the feeding path, the second image reading unit being configured to read an image on a second side of the document sheet being conveyed on the feeding path and output second read data corresponding to the read image of the second side, sequentially on a line-by-line basis;
a storage unit configured to store the first read data output from the first image reading unit and the second read data output from the second image reading unit;
a reading condition setting unit configured to set a reading condition for document reading by the first image reading unit and the second image reading unit;
an image output unit configured to output the first read data and the second read data stored on the storage unit; and
a controller configured to implement one of a first control method and a second control method,
wherein in the first control method, when the reading condition setting unit sets as the reading condition a first condition that requires a larger storage capacity of the storage unit in the document reading, the controller controls:
the image output unit to output the second read data sequentially at each time when the storage unit stores the second read data that is output from the second image reading unit on the line-by-line basis;
the storage device to store the first read data during a time period from a time when a leading end of the document sheet reaches a reading position of the first image reading unit to a time when a trailing end of the document sheet passes through a reading position of the second image reading unit; and
the image output unit to sequentially output the first read data stored on the storage unit, after completely outputting the second read data, and
wherein in the second control method, when the reading condition setting unit sets as the reading condition a second condition that requires a smaller storage capacity of the storage unit in the document reading, the controller controls:
the image output unit to output the first read data sequentially at each time when the storage unit stores the first read data that is output from the first image reading unit on the line-by-line basis;
the storage device to store one page of the second read data; and
the image output unit to sequentially output the second read data stored on the storage unit, after completely outputting the first read data.

7. The image reader according to claim 6,
wherein the reading condition setting unit sets, as the reading condition, one of a plurality of document sizes, and
wherein when the document size set by the reading condition setting unit is equal to or more than a predetermined size, the controller applies one of the first control method and the second control method based on a determination that the reading condition is the first condition, and
wherein when the document size set by the reading condition setting unit is less than the predetermined size, the controller applies one of the first control method and the second control method based on a determination that the reading condition is the second condition.

8. The image reader according to claim 6,
wherein the reading condition setting unit sets, as the reading condition, a resolution for the document reading by the first image reading unit and the second image reading unit, and
wherein when the resolution set by the reading condition setting unit is equal to or more than a predetermined value, the controller applies one of the first control method and the second control method based on a determination that the reading condition is the first condition, and
wherein when the resolution set by the reading condition setting unit is less than the predetermined value, the controller applies one of the first control method and the second control method based on a determination that the reading condition is the second condition.

9. The image reader according to claim 6, configured to implement multiple functions that include functions other than an image reading function,
  wherein the first condition that requires a larger storage capacity of the storage unit in the document reading is a reading condition where a difference is larger than an enough storage capacity to implement the functions other than the image reading function, which difference is a storage capacity difference between:
    a storage capacity required to store one page of the second read data output from the second image reading unit; and
    a storage capacity required to store the first read data during the time period from the time when the leading end of the document sheet reaches the reading position of the first image reading unit to the time when the trailing end of the document sheet passes through the reading position of the second image reading unit.

* * * * *